United States Patent
Kim et al.

(10) Patent No.: US 7,873,956 B2
(45) Date of Patent: Jan. 18, 2011

(54) COMMUNICATION TERMINAL AND COMMUNICATION NETWORK FOR PARTIALLY UPDATING SOFTWARE, SOFTWARE UPDATE METHOD, AND SOFTWARE CREATION DEVICE AND METHOD THEREFOR

(75) Inventors: Jae-wook Kim, Seoul (KR); Sung-wook Yoo, Gyunggi-do (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1297 days.

(21) Appl. No.: 10/948,325

(22) Filed: Sep. 24, 2004

(65) Prior Publication Data

US 2005/0071839 A1    Mar. 31, 2005

(30) Foreign Application Priority Data

Sep. 25, 2003   (KR) ................. 10-2003-0066693
Jul. 23, 2004   (KR) ................. 10-2004-0057776

(51) Int. Cl.
*G06F 9/44* (2006.01)

(52) U.S. Cl. ................................. 717/168

(58) Field of Classification Search .......... 717/122, 717/120, 168, 169, 170, 171, 172, 173
See application file for complete search history.

(56) References Cited

U.S. PATENT DOCUMENTS

| | | | | |
|---|---|---|---|---|
| 5,835,911 A * | 11/1998 | Nakagawa et al. | ........ | 707/203 |
| 6,470,329 B1 * | 10/2002 | Livschitz | ........ | 707/1 |
| 7,117,494 B2 * | 10/2006 | Rajaram | ........ | 717/174 |
| 2004/0031029 A1 * | 2/2004 | Lee et al. | ........ | 717/171 |
| 2005/0038955 A1 * | 2/2005 | Chen | ........ | 711/103 |
| 2007/0220504 A1 * | 9/2007 | Eker | ........ | 717/168 |

FOREIGN PATENT DOCUMENTS

WO    WO 03/013103 A2    2/2003

* cited by examiner

*Primary Examiner*—Philip Wang
(74) *Attorney, Agent, or Firm*—H.C. Park & Associates, PLC

(57) ABSTRACT

Disclosed herein are a communication terminal and communication network for partially updating software, a software update method, and a software creation device and method therefor. The software is divided into a plurality of areas each having a predetermined size, and unique identification keys are assigned to the areas of the software, respectively. A search is made for at least one changed area among the areas of the software on the basis of version information of the software or the identification keys, and data of the changed area is downloaded to upgrade the software. Therefore, it is possible to shorten an upgrade time of the software.

15 Claims, 23 Drawing Sheets

FIG.9

CMD_RAM COMMAND MESSAGE

| Field | Length |
|---|---|
| Start Flag | 1 |
| packet size | 2 |
| command(CMD_RAM) | 1 |
| terminal memory address where data is to be stored | 4 |
| data length | 4 |
| data | data length |
| CRC | 2 |

Reponse

| Field | Length |
|---|---|
| Start Flag | 1 |
| error code | 1 |
| CRC | 2 |

FIG. 10

CMD_DECOMPRESS
COMMAND MESSAGE

| Field | Length |
| --- | --- |
| Start Flag | 1 |
| packet size | 2 |
| command (CMD_DECOMPRESS) | 1 |
| address where compressed data is to be stored | 4 |
| length of compressed data | 4 |
| address where decompressed data is to be stored | 4 |
| CRC | 2 |

Reponse

| Field | Length |
| --- | --- |
| Start Flag | 1 |
| error code | 1 |
| CRC | 2 |

FIG. 11

CMD_ERASE COMMAND MESSAGE

| Field | Length |
|---|---|
| Start Flag | 1 |
| packet size | 2 |
| command (CMD_ERASE) | 1 |
| memory address where data is to be erased | 4 |
| exception block or not | 1 |
| CRC | 2 |

Reponse

| Field | Length |
|---|---|
| Start Flag | 1 |
| error code | 1 |
| CRC | 2 |

FIG. 12

CMD_PROGRAM COMMAND MESSAGE

| Field | Length |
|---|---|
| Start Flag | 1 |
| packet size | 2 |
| command (CMD_PROGRAM) | 1 |
| memory address where data to be programmed is stored | 4 |
| length of data to be programmed | 4 |
| memory address where data is to be programmed | 4 |
| CRC | 2 |

Reponse

| Field | Length |
|---|---|
| Start Flag | 1 |
| error code | 1 |
| CRC | 2 |

FIG. 13

CMD_FINISH COMMAND MESSAGE

| Field | Length |
|---|---|
| Start Flag | 1 |
| packet size | 2 |
| command (CMD_FINISH) | 1 |
| CRC | 2 |

COMMUNICATION TERMINAL AND COMMUNICATION NETWORK FOR PARTIALLY UPDATING SOFTWARE, SOFTWARE UPDATE METHOD, AND SOFTWARE CREATION DEVICE AND METHOD THEREFOR

CROSS REFERENCE TO RELATED APPLICATIONS

This application claims priority from and the benefit of Korean Patent Application No. 10-2003-66693, filed on Sep. 25, 2003, and Korean Patent Application No. 10-2004-57776, filed on Jul. 23, 2004, which are both hereby incorporated by reference for all purposes as if fully set forth herein.

BACKGROUND OF THE INVENTION

1. Field of the Invention

The present invention relates to a communication terminal and communication network for partially updating software, a software update method, and a software creation device and method therefor, and more particularly to a software update technique which is capable of downloading and updating a changed part of software embedded in an embedded device.

2. Description of the Related Art

Embedded devices typically refer to devices that software is embedded in chip thereof, such as mobile phones, personal digital assistants (PDAs), etc.

In order to update or upgrade (hereinafter simply "update") software embedded in the embedded device, a user of the embedded device usually visits a business office associated with the embedded device to request update of the software, and an operator of the business office connects the embedded device to an update terminal (e.g., personal computer) having a new version of software to download a new version of the software from the update terminal to the embedded device and change the software to the new version of software.

In a conventional method for updating software embedded in the embedded device, the update terminal is first connected with the embedded device to provide a download service for the software embedded in the embedded device. The update terminal then determines whether or not a change has occurred in the software embedded in the embedded device by comparing files of the software with corresponding files of a new version of software stored in the update terminal. Upon determining that a change has occurred in the software embedded in the embedded device, the update terminal updates the software by downloading the new version of software to the embedded device.

However, the above-mentioned conventional software update method has disadvantages in that a lot of software upgrade time is spent. This is because the update terminal has to download all files of the new version of software stored therein to the embedded device.

SUMMARY OF THE INVENTION

Therefore, it is an object of the present invention to provide a communication terminal and communication network for partially updating software, a software update method, and a software creation device and method therefor, wherein the software is divided into a plurality of areas each having a predetermined size, unique identification keys are assigned to the areas of the software, respectively, a search is made for at least one changed area among the areas of the software on the basis of the identification keys, and data of only the changed area is downloaded to upgrade the software, thereby making it possible to shorten an upgrade time of the software, which is embedded in an embedded device.

In accordance with an aspect of the present invention, the above and other objects can be accomplished by the provision of a communication terminal comprising: a software including a plurality of areas; a memory for storing respective identification keys of the areas; and an update processor for updating a desired one of the plurality of areas using the identification keys.

The update processor may be adapted to send the respective identification keys of the areas of the software in response to an identification key request from an external portion.

The update processor may be adapted to send a version information of the software in response to a version information request from an external portion.

The update processor may be adapted to receive a new version of the desired area of the software from an external portion and write the received new version in a corresponding area.

The corresponding area to be updated may be determined through a comparison of identification keys or version information between old and new versions thereof.

In accordance with another aspect of the present invention, there is provided a communication terminal comprising: a software including a plurality of areas; a transmitter for transmitting information on the software; and an update processor for receiving a new version of a desired one of the areas of the software and updating the desired area with the received new version.

The information on the software may be an identification key assigned to each of the areas of the software.

The information on the software may be a version information of the software.

The desired area to be updated may be determined through a comparison of identification keys or version information between old and new versions thereof.

In accordance with another aspect of the present invention, there is provided a communication terminal comprising: a software including a plurality of areas; a requester for requesting update of the software; and an update processor for receiving a new version of a desired one of the areas of the software and updating the desired area with the received new version.

An identification key may be assigned to each of the areas of the software.

The desired area to be updated may be determined through a comparison of identification keys or version information between old and new versions thereof.

In accordance with another aspect of the present invention, there is provided a communication network comprising: a communication terminal including an old version software; and an update system including a new version software corresponding the old version software, determining a different part between the old version software and the new version software and sending data of a part of the new version software corresponding to the different part to the communication terminal.

In accordance with another aspect of the present invention, there is provided a communication network comprising: a communication terminal including an old version software with a plurality of areas and requesting update of the old version software; and an update system including a new version software with a plurality of areas corresponding to the old version software, determining in response to the update request from the communication terminal whether a specific area to be updated is present among the areas of the old version software and, upon determining that the specific area to be updated is present, sending data of one of the areas of the new version software corresponding to the specific area to the communication terminal.

Each of the old version software and new version software may include a plurality of areas, each of the areas being assigned an identification key, and the update system may be adapted to determine the different part between the old version software and the new version software by receiving the respective identification keys of the areas of the old version software from the communication terminal and comparing the received identification keys with the respective identification keys of the areas of the new version software.

The update system may be adapted to determine the different part between the old version software and the new version software through a comparison of version information between the old version software and the new version software.

In accordance with another aspect of the present invention, there is provided a method for updating an old version software with a new version software, comprising: determining a different part between the old version software and the new version software by comparing information of the old version software with information of the new version software; and writing data of a part of the new version software corresponding to the different part in a part of the old version software corresponding to the different part.

In accordance with another aspect of the present invention, there is provided a method for updating an old version software with a new version software, comprising: providing information of the old version software; receiving data of a part of the new version software corresponding to a different part between the old version software and the new version software; and writing the received data in a part of the old version software corresponding to the different part.

In accordance with another aspect of the present invention, there is provided a method for updating an old version software with a new version software, comprising: determining a different part between the old version software and the new version software through a comparison of information therebetween; sending data of a part of the new version software corresponding to the different part; and receiving the sent data and writing the received data in a part of the old version software corresponding to the different part.

Each of the old version software and new version software may include a plurality of areas, each of the areas being assigned an identification key, and the different part between the old version software and the new version software may be determined by comparing the respective identification keys of the areas of the old version software with the respective identification keys of the areas of the new version software.

The different part between the old version software and the new version software may be determined through a comparison of version information between the old version software and the new version software.

In accordance with another aspect of the present invention, there is provided a software creation device comprising: an area divider for dividing a desired software into a plurality of areas, each of the areas having a predetermined size; and an identification key creator for creating respective identification keys of the areas divided by the area divider.

The software creation device may further comprise an identification key storage unit for storing the identification keys created by the identification key creator.

The identification keys may be stored in a desired region of the software.

The identification keys may be stored in a desired memory area.

In accordance with another aspect of the present invention, there is provided a software creation method comprising: dividing a desired software into a plurality of areas, each of the areas having a predetermined size; and creating respective identification keys of the divided areas.

The software creation method may further comprise storing the created identification keys in a desired region of the software.

The software creation method may further comprise storing the created identification keys in a desired memory area.

In accordance with another aspect of the present invention, there is provided a communication terminal, comprising: a software having an identification key; and a memory storing the software, wherein the identification key is generated by a hash function.

In accordance with another aspect of the present invention, there is provided a method of creating a software, creating a desired software; creating an identification key which identifies the software using a hash function; storing the identification key in a predetermined region of the software.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a view showing data structures of a CMD_RAM command and response information thereto;

FIG. 10 is a view showing data structures of a CMD_DECOMPRESS command and response information thereto;

FIG. 11 is a view showing data structures of a CMD_ERASE command and response information thereto;

FIG. 12 is a view showing data structures of a CMD_PROGRAM command and response information thereto; and FIG. 13 is a view showing a data structure of a CMD_FINISH command.

DESCRIPTION OF THE PREFERRED EMBODIMENTS

Exemplary embodiments according to the present invention will now be described in detail with reference to the accompanying drawings.

The present invention basically proposes two methods to update or upgrade (hereinafter simply "update") software in communication terminals.

The first method is to compare identification keys of a plurality of areas of old version software with those of a plurality of areas of new version software, respectively, and update, among a plurality of areas of the old version software, an area whose identification key is different from that of a corresponding area of the new version software.

The second method is to compare the versions of old version software and new version software, each including a plurality of areas, and if the versions are different, update only at least one area which is different from a corresponding area of the new version software, among a plurality of areas of the old version software.

A description will hereinafter be given of preferred embodiments of the present invention that update software embedded in communication terminals including embedded devices, using the above two methods.

Figure 1:
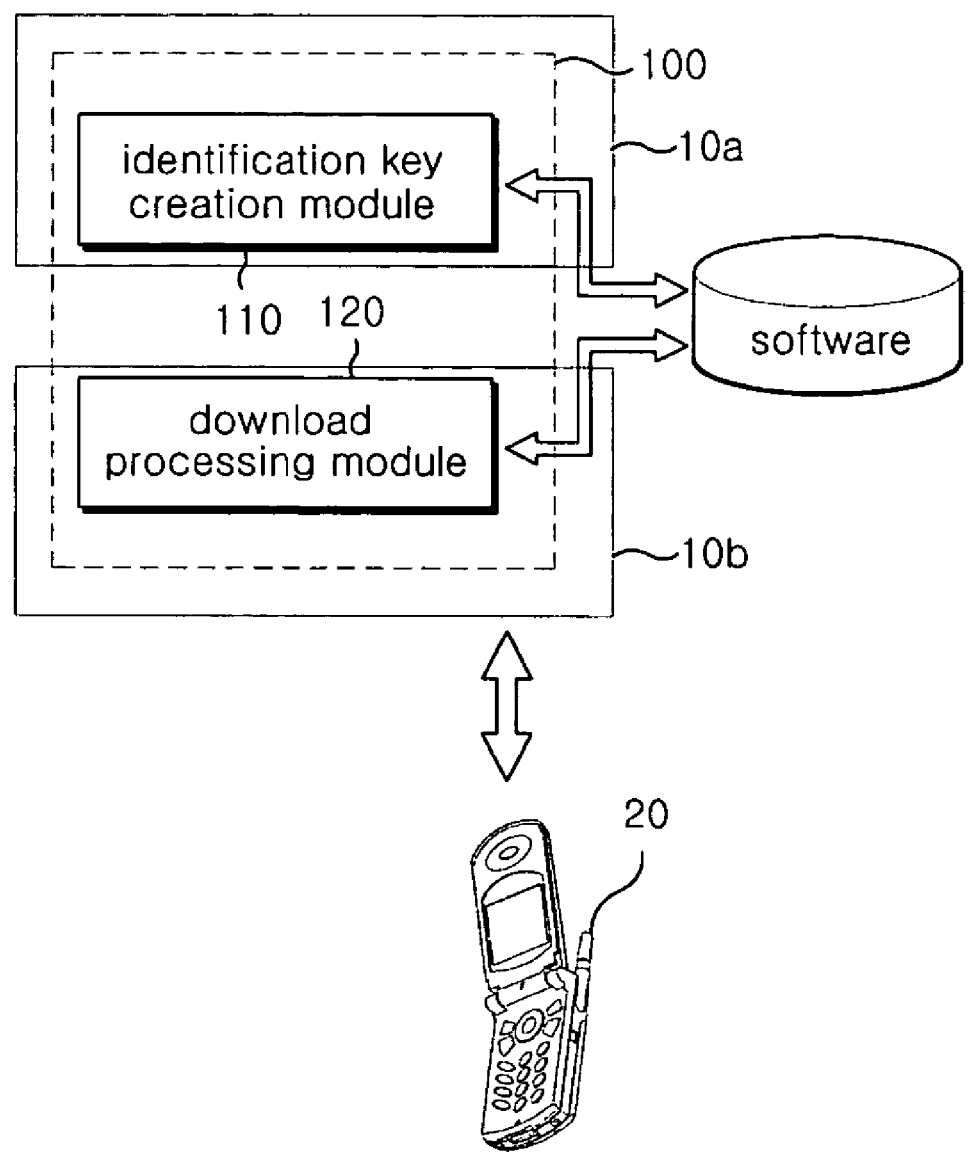
FIG. 1 is a schematic view of a system for providing a service of partially updating software embedded in an embedded device, according to the present invention.

FIG. 1 is a schematic view of a system for providing a service of partially updating software embedded in an embedded device, according to a preferred embodiment of the present invention.

As shown in FIG. 1, a software update service system according to the present invention, denoted by the reference numeral 100, comprises an identification key creation module 110 which is run in a manufacturer terminal 10a of a manufacturer of the embedded device 20 and a download processing module 120 which is run in an update terminal 10b of a business office that provides an update service for the software embedded in the embedded device 20.

The identification key creation module 110 is adapted to divide software to be downloaded to the embedded device 20 into a plurality of areas each having a predetermined size, create respective unique identification keys of the divided areas, and store the created identification keys.

That is, before putting the embedded device 20 on the market, the embedded device manufacturer equips the embedded device 20 with software divided into a plurality of areas each having a predetermined size and respective unique identification keys of the divided areas so that data of only at least one changed area among the areas of the software can be downloaded to the embedded device 20 when the software is updated at a later time. At this time, the identification key creation module 110 divides the software to be equipped in the embedded device 20 into the plurality of areas each having the predetermined size, creates the respective unique identification keys of the divided areas, and stores the created identification keys in both the embedded device 20 and the manufacturer terminal 10a.

The download processing module 120 is adapted to compare the identification key of each area of the software embedded in the embedded device 20 with that of each area of software stored in the business office terminal 10b that provides the download service, and, if the identification key of at least one of the areas of the software in the business office terminal 10b is determined to be different from that of a corresponding one of the areas of the software in the embedded device 20 as a result of the comparison, send the identification key and data of the at least one area of the software in the update terminal 10b to the embedded device 20 to change data of the corresponding area of the software in the embedded device 20 to the sent data and update the identification key of the corresponding area with the sent identification key.

A user of the embedded device 20 usually visits an A/S (After Service) center, business office or the like associated with the embedded device 20 to request an update of the software embedded in the device 20. At this time, in response to the user's request, the download processing module 120 acts to search for a changed part of the software embedded in the embedded device and download data of only the changed part to the embedded device.

The partial software updating by the download processing module 120 can be typically performed in two ways. In the first way, as in the case of a mobile phone, the update terminal 10b of the business office, which provides the partial software update service, compulsorily sends data of a changed area to the embedded device 20 to update the software. In the second way, the embedded device 20 requests data of a changed area from the update terminal 10b to automatically update the software embedded therein.

As described above, the identification key creation module 110 is typically run in the manufacturer terminal 10a of the manufacturer of the embedded device which equips the embedded device with software before putting it on the market. Also, the download processing module 120 is typically run in the update terminal 10b of the A/S center, business office or the like that supports the embedded device's customer.

Alternatively, for efficient management of an identification key of each area for the partial software update service, or for installation of new software in the embedded device or partial updating of the existing software in the embedded device with the new software when the existing software has been outdated by the new software, the identification key creation module 110 and the download processing module 120 may be embedded and run in the same business office terminal 10b that provides the partial software update service.

On the other hand, a software update according to the present invention can be implemented by an over the air (OTA) procedure. That is, a mobile communication terminal with software embedded therein can be linked to a mobile communication system with the download processing module installed therein through a mobile communication network so that a portion of software corresponding to a new version can be downloaded to the embedded to the mobile communication terminal through the OTA procedure.

The configurations of the identification key creation module 110 and the download processing module 120 will hereinafter be described in detail.

Figure 2:
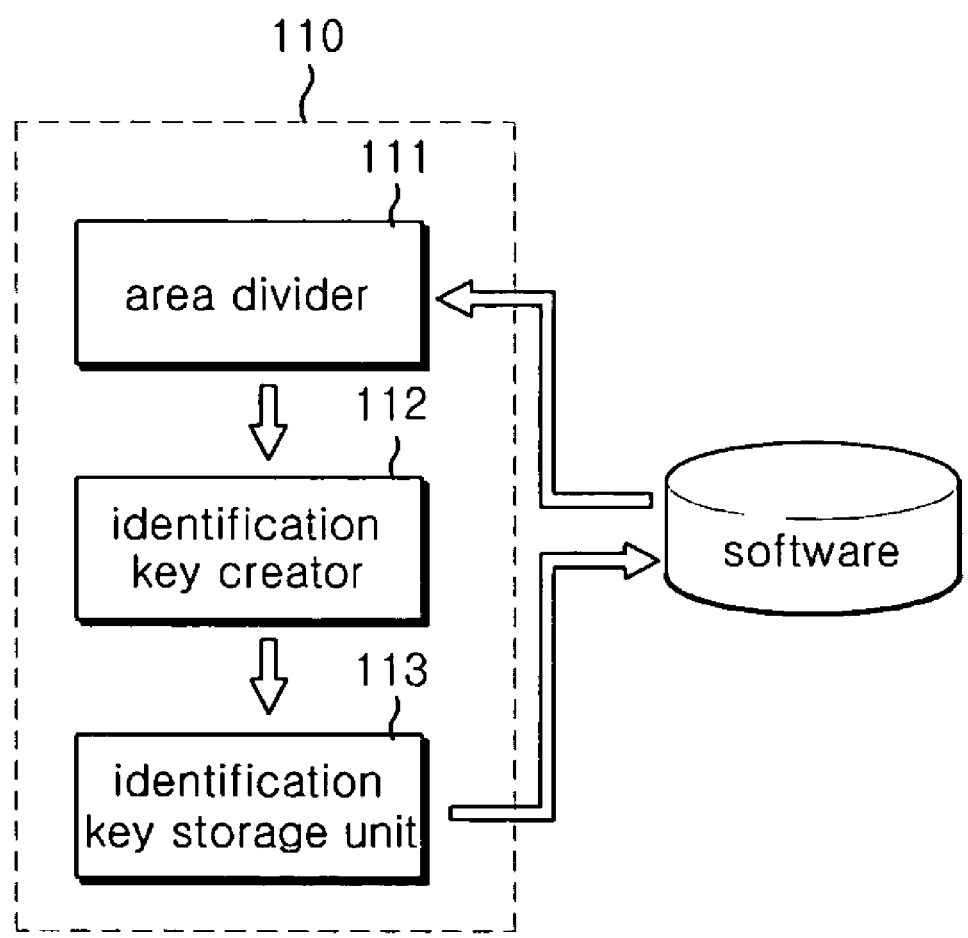
FIG. 2 is a block diagram of an embodiment of an identification key creation module in the partial software update service system according to the present invention.

FIG. 2 is a block diagram of an embodiment of the identification key creation module 110 according to a preferred embodiment of the present invention.

As shown in FIG. 2, the identification key creation module 110 includes an area divider 111, an identification key creator 112 and an identification key storage unit 113.

The area divider 111 acts to divide desired software into a plurality of areas each having a predetermined size.

For example, assuming that the size of the desired software is 16 MB, the area divider 111 of the identification key creation module 110 may divide the software by a predetermined size of 64 KB to provide a total of 256 areas.

The identification key creator 112 acts to create respective identification keys of a plurality of areas divided by the area divider 111.

The identification keys can be created in various ways. For example, the identification keys may be created using an MD5 algorithm. In this case, each identification key created by processing 64 KB data has a size of 16 bytes.

It is preferable that the identification key creator 112 creates a unique identification key for each area such that different areas do not have the same identification key.

The reason is that, if different areas have the same identification key, there is a high probability of a collision occurring when a comparison is made between an identification key of each area of the software embedded in the embedded device 20 and an identification key of each area of new version software stored in the update terminal 10b that provides the software download service.

It is also preferable that each of the identification keys of the divided areas created by the identification key creator 112 have a size less than a predetermined percentage of the size of a corresponding one of the areas.

The reason is that, if a larger identification key is used for the identification key comparison, a larger amount of comparison time is required and a larger storage region is required for storing the identification key.

The above two conditions can be satisfied by using the MD5 algorithm. The MD5 algorithm is an algorithm that is used to verify data integrity through the creation of a 128-bit (16-byte) message digest from data input (which may be a message of any length). MD5, which was developed by Professor Ronald L. Rivest of MIT, is intended for use with digital signature applications, which require that large files be compressed by a secure method before being encrypted with a secret key, under a public key cryptosystem such as RSA. MD5 is currently standardized in Internet Engineering Task Force (IETF) Request for Comments (RFC) 1321. According to the standard, it is "computationally infeasible" that any two messages that have been input to the MD5 algorithm could have as the output the same message digest, or that a false message could be created through apprehension of the message digest.

For example, each of the identification keys of the divided areas may be a value obtained by hashing a corresponding one of the areas using a hash function based on the MD5 standard.

The identification key storage unit 113 acts to store the identification key of each area created by the identification key creator 112.

For example, when the 16 MB software is divided into the 64 KB unit areas, the total size required to store the identification keys is 16 byte×256=4 KB since each of the identification keys created according to the MD5 algorithm is 16 bytes long.

At this time, the identification key storage unit 113 preferably stores the identification key of each area in a desired region of the desired software. Alternatively, it may store the identification keys in storage means of an associated terminal, such as a hard disk.

Operation of the identification key creation module 110 with the above-stated configuration will hereinafter be described with reference to FIG. 4.

Figure 4:
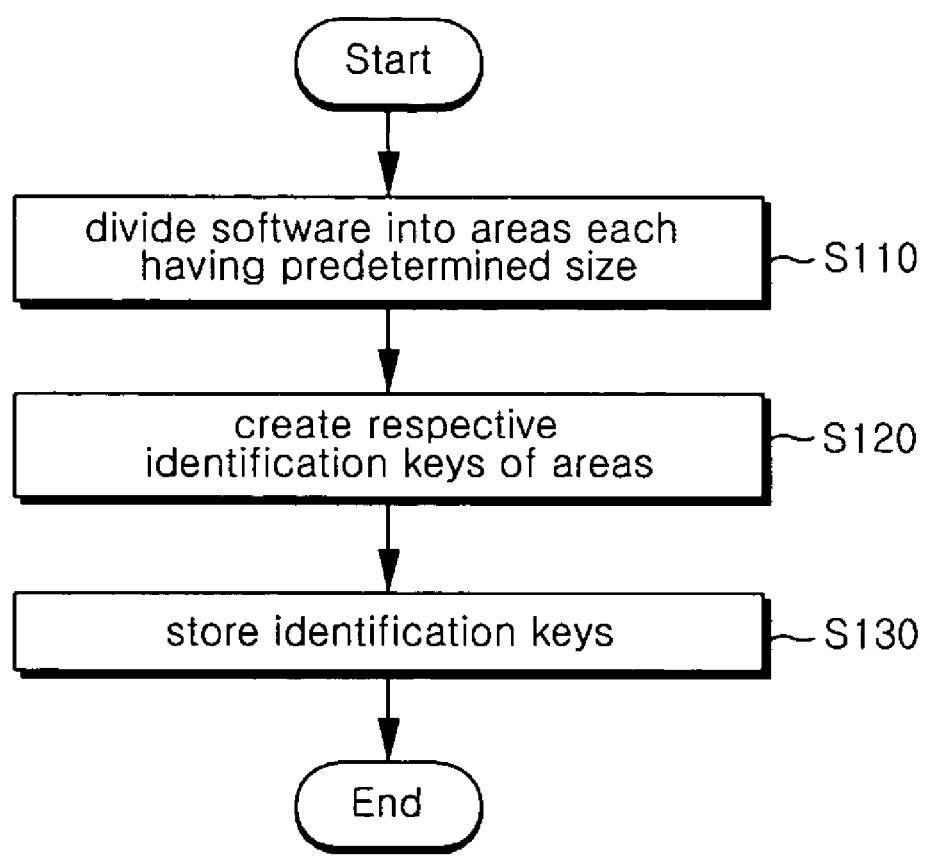
FIG. 4 is a flow chart illustrating an embodiment of an identification key creation process of the partial software update service system according to the present invention.

FIG. 4 is a flow chart illustrating an embodiment of an identification key creation process according to the present invention.

First, the identification key creation module 110 divides desired software into a plurality of areas each having a predetermined size at an area division step S110.

Then, at an identification key creation step S120, the identification key creation module 110 creates respective identification keys of the areas divided at the area division step S110.

At this time, the created identification keys are unique to the divided areas, respectively, such that the areas do not have the same identification key. Further, each of the created identification keys has a size less than a predetermined percentage of the size of a corresponding one of the areas.

Finally, at an identification key storage step S130, the identification key creation module 110 stores the identification key of each area created at the identification key creation step S120.

At this time, the identification key creation module 110 preferably stores the created identification key of each area in a desired region of the desired software. Alternatively, it may store the created identification keys in storage means of the business office terminal that provides the update service for the desired software.

In this manner, the identification keys are created to enable data of only a changed one of a plurality of areas of the desired software to be downloaded.

Figure 3A:
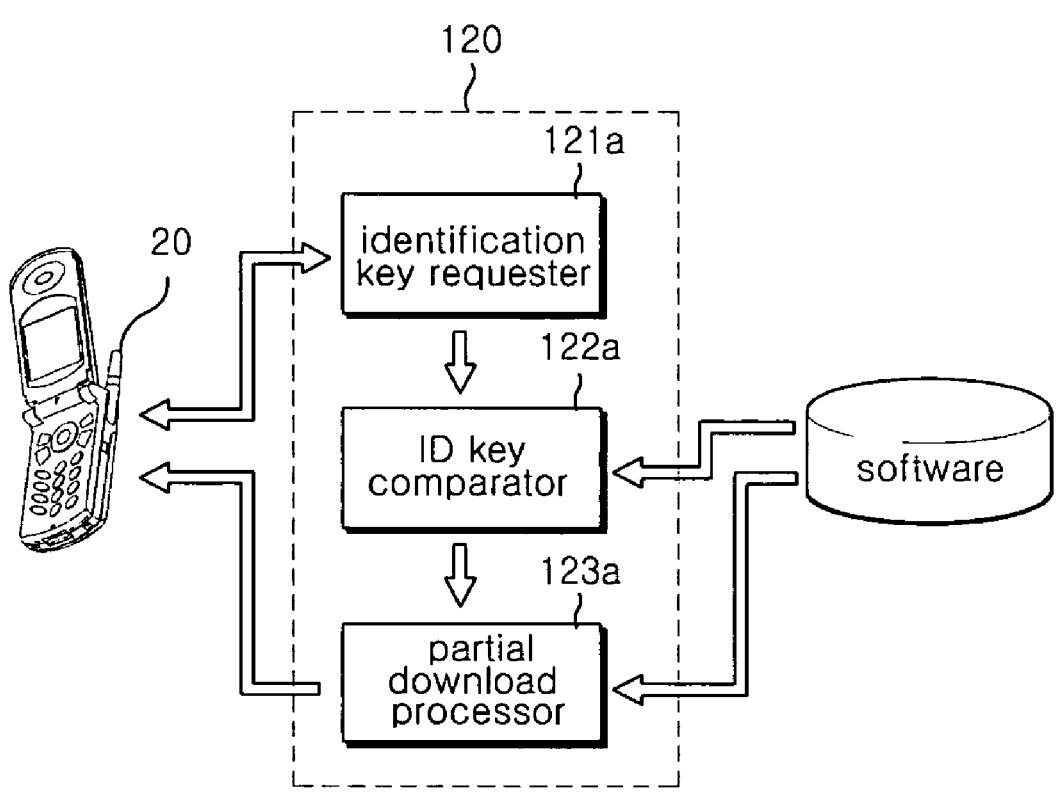
FIG. 3a is a block diagram of an embodiment of a download processing module in the partial software update service system according to the present invention.

FIG. 3a is a block diagram of an embodiment of the download processing module 120 according to the present invention.

In the present embodiment, the download processing module 120 compulsorily sends data of a changed area from the business office terminal 10b, which provides the partial software update service, to the embedded device 20 to update the software. To this end, the download processing module 120 includes an identification key requester 121a, an identification key comparator 122a and a partial download processor 123a.

The identification key requester 121a acts to request and receive the identification key of each area of the software embedded in the embedded device 20 from the embedded device 20.

For example, if the user of the embedded device 20, such as a mobile phone, visits a business office of a communication company associated with the embedded device to request an update of the software embedded in the embedded device, an operator of the business office connects the embedded device to the business office terminal 10b that provides the partial software update service, such as a computer, and then operates the system for providing the service of partially updating the software embedded in the embedded device, according to the present invention.

Then, in the business office terminal 10b, the identification key requester 121a of the download processing module 120 requests and receives the identification key of each area of the software embedded in the embedded device 20 from the device 20.

At this time, the identification keys are preferably stored in a desired region of the software embedded in the embedded device 20. Alternatively, the identification keys may be stored in a nonvolatile memory of the embedded device 20, such as a flash read only memory (ROM), separately from the software.

The identification key comparator 122a acts to compare the identification key of each area received by the identification key requester 121a with that of each area of new version software to be downloaded.

That is, the identification key comparator 122a of the download processing module 120 compares the identification keys received from the embedded device 20 of the user with those of new version software to be downloaded, stored in the business office terminal 10b that provides the partial software update service, on an area-by-area basis.

If the identification key of at least one of the areas of the software in the business office terminal 10b is determined as different from that of a corresponding one of the areas of the software in the embedded device 20 as a result of the comparison by the identification key comparator 122a, the partial download processor 123a acts to send the identification key and data of the at least one area of the software in the terminal 10b to the embedded device 20 to substitute data of the corresponding area of the software in the embedded device 20 with the sent data and update the identification key of the corresponding area with the sent identification key.

That is, the partial download processor 123a of the download processing module 120 extracts, from the software stored in the business office terminal 10b that provides the partial software update service, data of at least one area whose identification key is determined to be different from that of the corresponding area of the software embedded in the embedded device 20 as a result of the area-unit comparison and send the extracted data to the embedded device 20 to overwrite it on the corresponding area of the software in the embedded device 20. As a result, a changed part of the software embedded in the embedded device 20 is downloaded to the embedded device 20. The partial download processor 123a further sends a changed identification key to the embedded device 20. Therefore, the identification key of the corresponding area stored in the identification key storage region is updated with the different identification key for area-unit comparison when the software is updated at a later time.

The operation of the download processing module 120 with the above-stated configuration will hereinafter be described with reference to FIG. 5a.

Figure 5A:
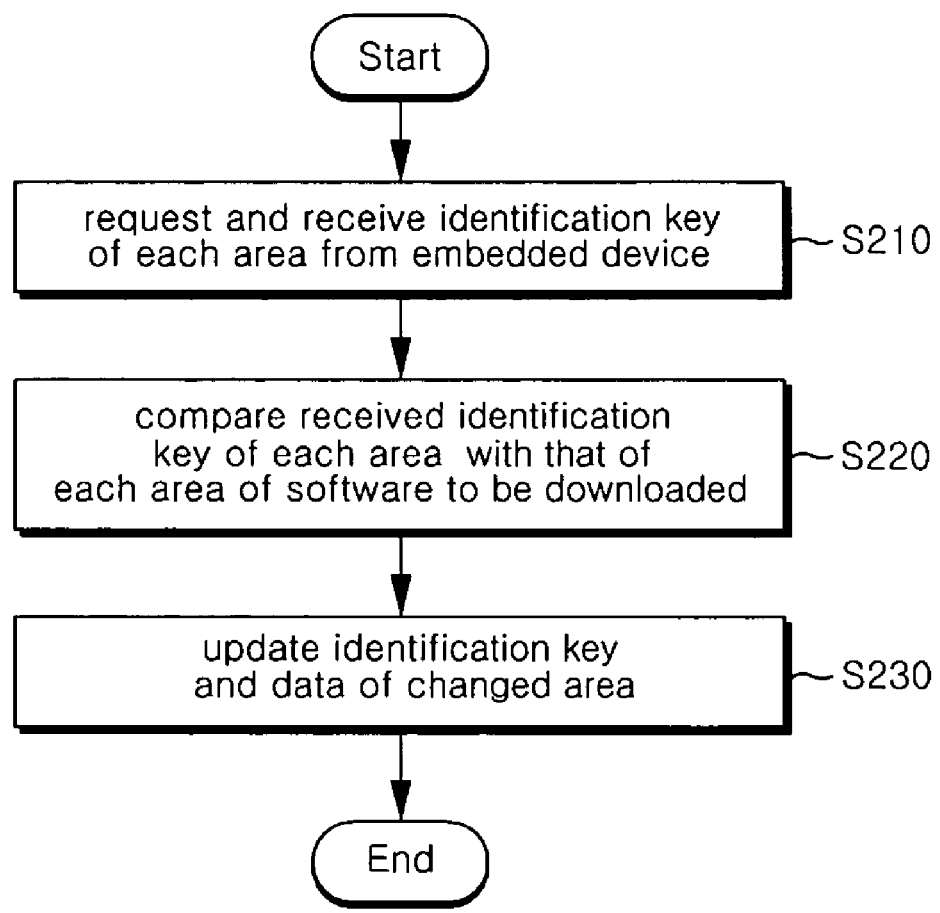
FIG. 5a is a flow chart illustrating an embodiment of a partial download process of the partial software update service system according to the present invention.

FIG. 5a is a flow chart illustrating an embodiment of a partial download process according to the present invention.

First, the download processing module 120 requests and receives the identification key of each area of the software embedded in the embedded device 20 from the embedded device 20 at an identification key request step S210.

Then, at an identification key comparison step S220, the download processing module 120 compares the identification key of each area received at the identification key request step S210 with that of each area of software to be downloaded.

Finally, at a partial download processing step S230, if the identification key of at least one of the areas of the software to be downloaded is determined to be different from that of a corresponding one of the areas of the software in the embedded device 20 at the identification key comparison step S220, the download processing module 120 sends the identification key and data of the at least one area to the embedded device 20 to substitute data of the corresponding area of the software in the embedded device 20 with the sent data and update the identification key of the corresponding area with the sent identification key.

In this manner, a search is made for at least one changed area among the areas of the software embedded in the embedded device 20 on the basis of the identification keys, and data of only the changed area is downloaded to the embedded device 20 to upgrade the software therein. Therefore, it is possible to shorten an upgrade time of the software embedded in the embedded device 20.

Figure 3B:
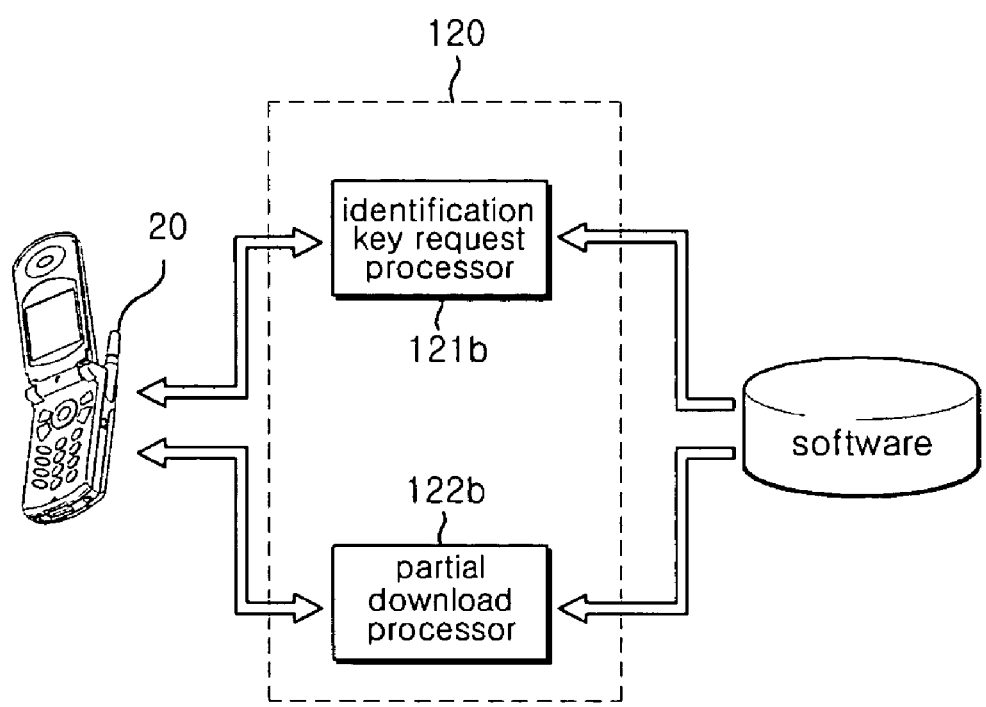
FIG. 3b is a block diagram of another embodiment of the download processing module in the partial software update service system according to the present invention.

FIG. 3b is a block diagram of another embodiment of the download processing module 120 according to the present invention.

In this embodiment, the embedded device 20 requests data of a changed area from the business office terminal 10b, which provides the partial software update service, to update the software embedded therein. To this end, the download processing module 120 includes an identification key request processor 121b and a partial download processor 122b.

The identification key request processor 121b acts to receive a request from the embedded device 20 for an identification key of each area of software to be downloaded and send the identification key of each area to the embedded device 20 in response to the received request.

For example, assume that Mobile Explorer is executed in an Internet accessible mobile terminal which is the embedded device 20.

If the Mobile Explorer is executed by the user of the mobile terminal, then an automatic update engine under control of an operating system (OS) of the mobile terminal is executed to request an identification key of each area of Mobile Explorer, software to be downloaded, from the business office terminal 10b so as to check whether the Mobile Explorer has been changed.

Then, in the business office terminal 10b, the identification key request processor 121b of the download processing module 120 sends the identification key of each area of the Mobile Explorer to be downloaded to the mobile terminal.

The automatic update engine in the mobile terminal compares the identification key of each area of the Mobile Explorer embedded in the mobile terminal with the identification key of each area of the Mobile Explorer received from the business office terminal 10b, on an area-by-area basis, and requests the business office terminal 10b to send data of the at least one area if the identification key of at least one of the areas of the Mobile Explorer to be downloaded is determined to be different from that of a corresponding one of the areas of the Mobile Explorer in the mobile terminal as a result of the comparison.

The partial download processor 122b acts to receive the data sending request from the mobile terminal and send the identification key and data of the at least one area to the mobile terminal in response to the received request to update the identification key and data of the corresponding area of the software in the mobile terminal.

That is, the partial download processor 122*b* of the download processing module 120 sends data of a changed area of the Mobile Explorer to the mobile terminal, or the embedded device 20, in response to the data sending request therefrom so that the update engine in the mobile terminal can update the Mobile Explorer. The partial download processor 122*b* further sends an identification key of the changed area to the mobile terminal so that the update engine can update data in an identification key storage region of the mobile terminal for area-unit comparison when the software is updated at a later time.

The update engine is run in the embedded device 20 to update the software embedded in the embedded device 20 by writing data of a changed area sent from the download processing module 120 into a random access memory (RAM) of the embedded device 20, erasing data of the corresponding area of the software stored in a flash memory of the embedded device 20, and writing the data of the changed area from the RAM into the corresponding area in the flash memory. The update engine is further adapted to receive an identification key of the changed area from the download processing module 120 and update an identification key of the corresponding area stored in the embedded device 20 with the received identification key. A description thereof will be made later in detail.

Operation of the download processing module 120 with the above-stated configuration will hereinafter be described with reference to FIG. 5*b*.

Figure 5B:
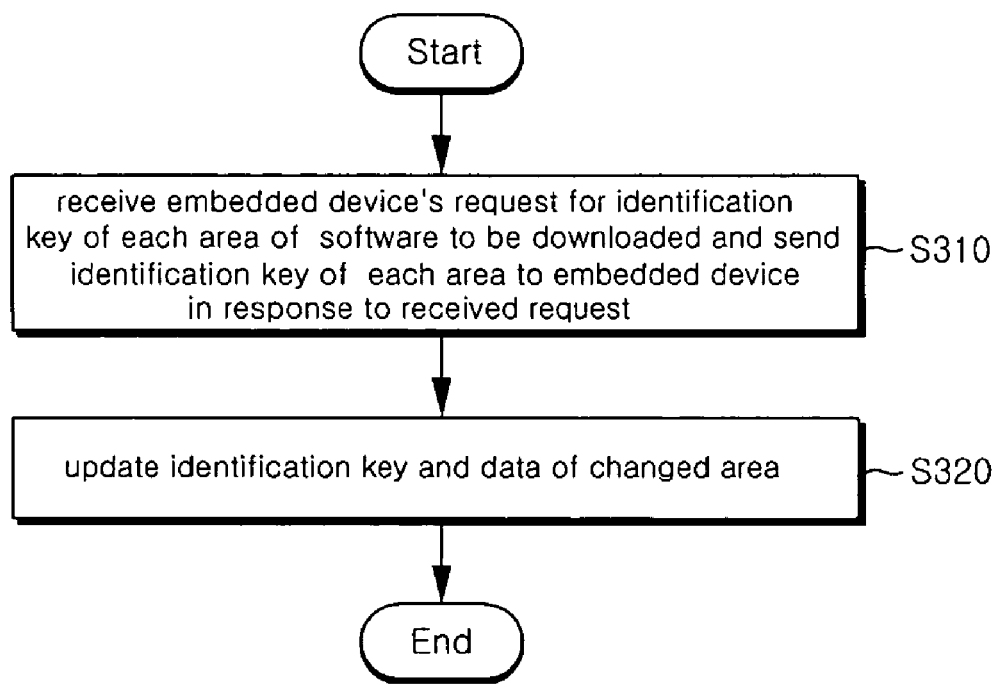
FIG. 5b is a flow chart illustrating another embodiment of the partial download process of the partial software update service system according to the present invention.

FIG. 5*b* is a flow chart illustrating another embodiment of the partial download process of the partial software update service system according to the present invention.

First, at an identification key request processing step S310, the download processing module 120 receives a request from the embedded device 20 for an identification key of each area of software to be downloaded and sends the identification key of each area to the embedded device 20 in response to the received request.

At a partial download processing step S320, the download processing module 120 receives a request from the embedded device 20 for data of at least one area, among the areas of the software to be downloaded, whose identification key is determined to be different from that of a corresponding one of the areas of the software embedded in the embedded device 20, and sends the identification key and data of the at least one area to the embedded device 20 in response to the received request to update the identification key and data of the corresponding area of the software in the embedded device 20.

In this manner, a search is made for at least one changed area among the areas of the software embedded in the embedded device 20 on the basis of the identification keys, and data of only the changed area is downloaded to the embedded device 20 to upgrade the software therein, thereby shortening an upgrade time of the software.

As described previously with reference to FIG. 3*b*, in order for the embedded device 20 to request data of a changed area of the software therein from the business office terminal 10*b* and update the software with the requested data, the embedded device or the software can include the automatic update engine.

Figure 3C:
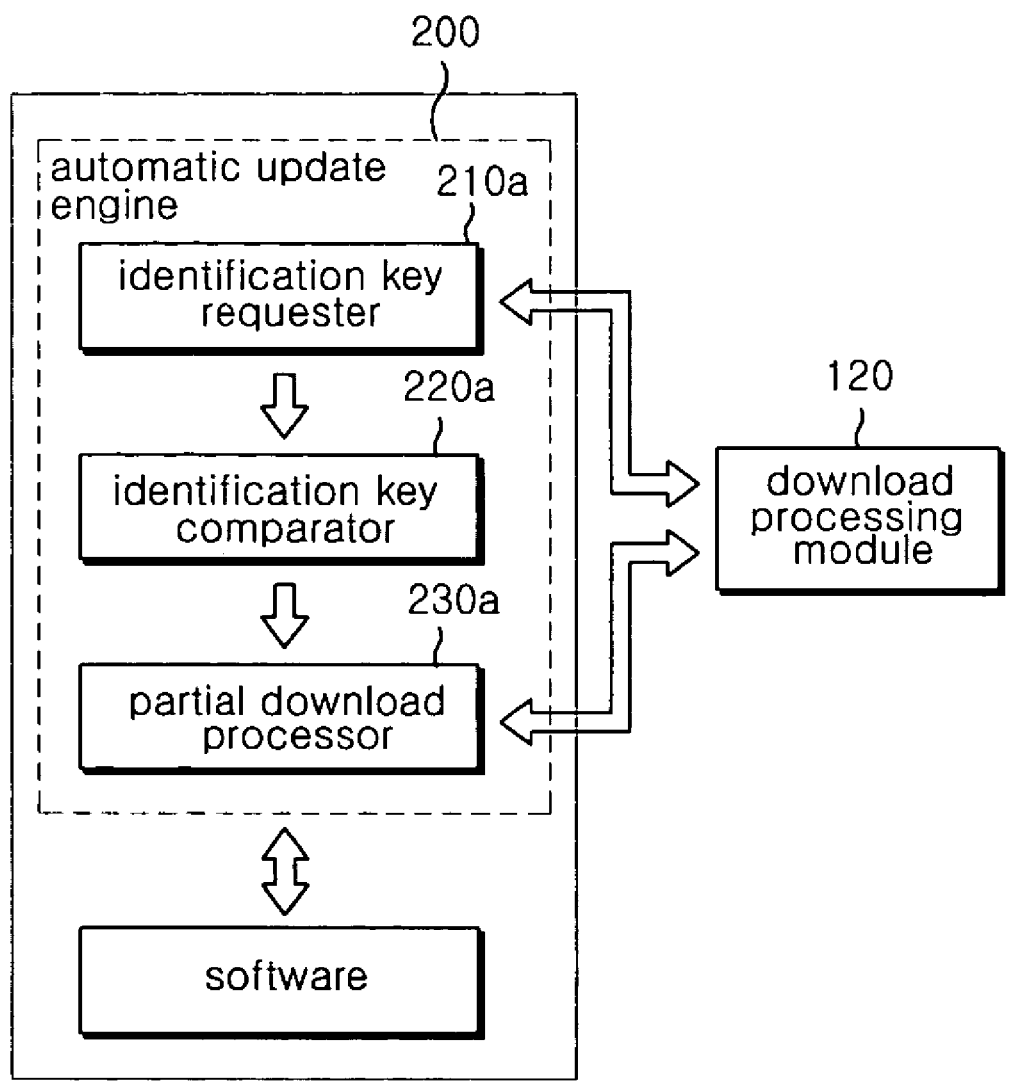
FIG. 3c is a block diagram of an embodiment of an automatic update engine in the embodiment of FIG. 3b, which is run in the embedded device.

FIG. 3*c* is a block diagram of an embodiment of the automatic update engine in the embodiment of FIG. 3*b*, which is run in the embedded device 20.

The automatic update engine 200 includes an identification key requester 210*a*, an identification key comparator 220*a*, and a partial download processor 230*a*.

The identification key requester 210*a* acts to request and receive an identification key of each area of software corresponding to the software embedded in the embedded device 20 from the business office terminal 10*b* to check whether the software in the embedded device 20 has been changed to the corresponding software.

That is, if the automatic update engine 200 requests the identification key of each area of the corresponding software from the business office terminal 10*b* through the identification key requester 210*a* to check whether the software in the embedded device 20 has been changed to the corresponding software, the business office terminal 10*b* sends the requested identification key of each area through the identification key request processor 121*b* of the download processing module 120. Then, the automatic update engine 200 receives the identification key of each area sent from the business office terminal 10*b* through the identification key requester 210*a*.

The identification key comparator 220*a* acts to compare the identification key of each area received from the business office terminal 10*b* with an identification key of each area of the software embedded in the embedded device 20.

That is, upon receiving the identification key of each area sent from the business office terminal 10*b*, the automatic update engine 200 compares the received identification key of each area with the identification key of each area stored in the embedded device 20 through the identification key comparator 220*a*.

The partial download processor 230*a* acts to, if the identification key of at least one of the areas of the corresponding software is determined to be different from that of a corresponding one of the areas of the software in the embedded device 20 as a result of the comparison by the identification key comparator 220*a*, request the business office terminal 10*b* to send data of the at least one area, receive the identification key and data of the at least one area sent from the terminal 10*b*, change data of the corresponding area of the software in the embedded device 20 to the received data and update the identification key of the corresponding area with the received identification key.

That is, if the automatic update engine 200 requests, through the partial download processor 230*a*, the business office terminal 10*b* to send the data of the at least one area whose identification key is determined to be different from the corresponding area of the software in the embedded device 20 as a result of the comparison by the identification key comparator 220*a*, the business office terminal 10*b* sends the identification key and data of the at least one area to the embedded device 20 through the partial download processor 122*b* of the download processing module 120. Then, the automatic update engine 200, through the partial download processor 230*a*, receives the identification key and data of the at least one area sent from the business office terminal 10*b*, changes the data of the corresponding area of the software in the embedded device 20 to the received data, and updates the identification key of the corresponding area with the received identification key.

In this manner, a search is made for at least one changed area among the areas of the software embedded in the embedded device 20 on the basis of the identification keys, and data of only the changed area is downloaded to the embedded device 20 to upgrade the software therein. Therefore, it is possible to shorten an upgrade time of the software embedded in the embedded device 20.

Figure 3D:
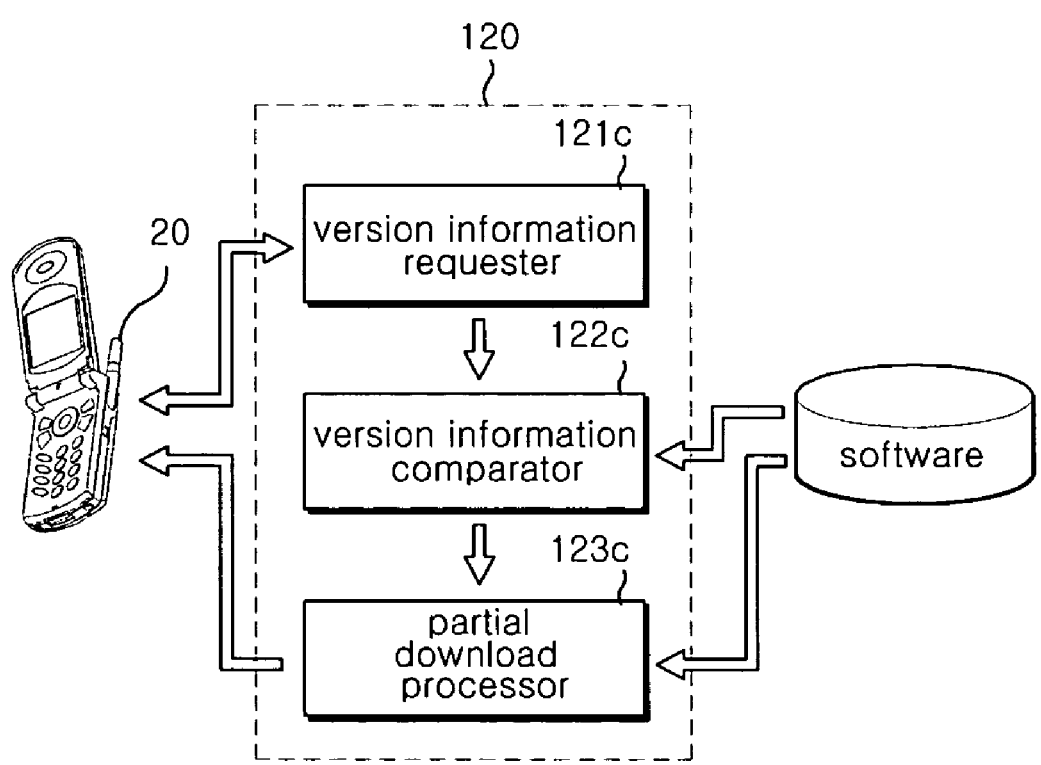
FIG. 3d is a block diagram of another embodiment of the download processing module in the partial software update service system according to the present invention.

FIG. 3*d* is a block diagram of another embodiment of the download processing module 120 in the partial software update service system according to the present invention.

In this embodiment, the download processing module 120 is adapted to check, through software version comparison, whether the software embedded in the embedded device 20 has been changed, in a different manner from that in the embodiment of FIG. 3a. To this end, the download processing module 120 includes a version information requester 121c, a version information comparator 122c and a partial download processor 123c.

The version information requester 121c acts to request and receive version information of the software embedded in the embedded device 20 from the embedded device 20.

For example, if the user of the embedded device 20, such as a mobile phone, visits a business office of a communication company associated with the embedded device to request upgrade of the software embedded in the embedded device, an operator of the business office connects the embedded device to the business office terminal 10b that provides the partial software update service, such as a computer, and then operates the system for providing the service of partially updating the software embedded in the embedded device, according to the present invention.

Then, in the business office terminal 10b, the version information requester 121c of the download processing module 120 requests and receives the version information of the software embedded in the embedded device 20 from the embedded device 20.

At this time, the version information of the software in the embedded device 20 is preferably stored in a header of an identification keys-by-areas file including the respective identification keys of the areas of the software, as will be described later in detail.

The version information comparator 122c acts to compare the version information received by the version information requester 121c with that of software to be downloaded.

That is, the version information comparator 122c of the download processing module 120 compares the version information received from the embedded device 20 of the user with that of software to be downloaded, which is stored in the business office terminal 10b that provides the partial software update service.

If the received version information is determined to be different from that of the software in the business office terminal 10b as a result of the comparison by the version information comparator 122c, the partial download processor 123c acts to compare an identification key of each area of the software in the business office terminal 10b with that of each area of the software in the embedded device 20. If the identification key of at least one of the areas of the software in the terminal 10b is determined to be different from that of a corresponding one of the areas of the software in the embedded device 20, the partial download processor 123c also acts to send the identification key and data of the at least one area of the software in the terminal 10b to the embedded device 20 to change data of the corresponding area of the software in the device 20 to the sent data and update the identification key of the corresponding area with the sent identification key.

That is, when the version information of the software in the embedded device 20 is not the same as that of the software in the business office terminal 10b, the partial download processor 123c of the download processing module 120 extracts, from the software in the terminal 10b, data of at least one area whose identification key is determined to be different from that of the corresponding area of the software in the embedded device 20 and send the extracted data to the embedded device 20 to overwrite it on the corresponding area of the software in the embedded device 20. As a result, data of only a changed part of the software embedded in the embedded device 20 is downloaded to the device 20. The partial download processor 123c further sends a changed identification key to the embedded device 20. Therefore, the identification key of the corresponding area stored in the identification key storage region is updated with the different identification key for area-unit comparison when the software is updated at a later time.

The operation of the download processing module 120 with the above-stated configuration will hereinafter be described with reference to FIG. 5c.

Figure 5C:
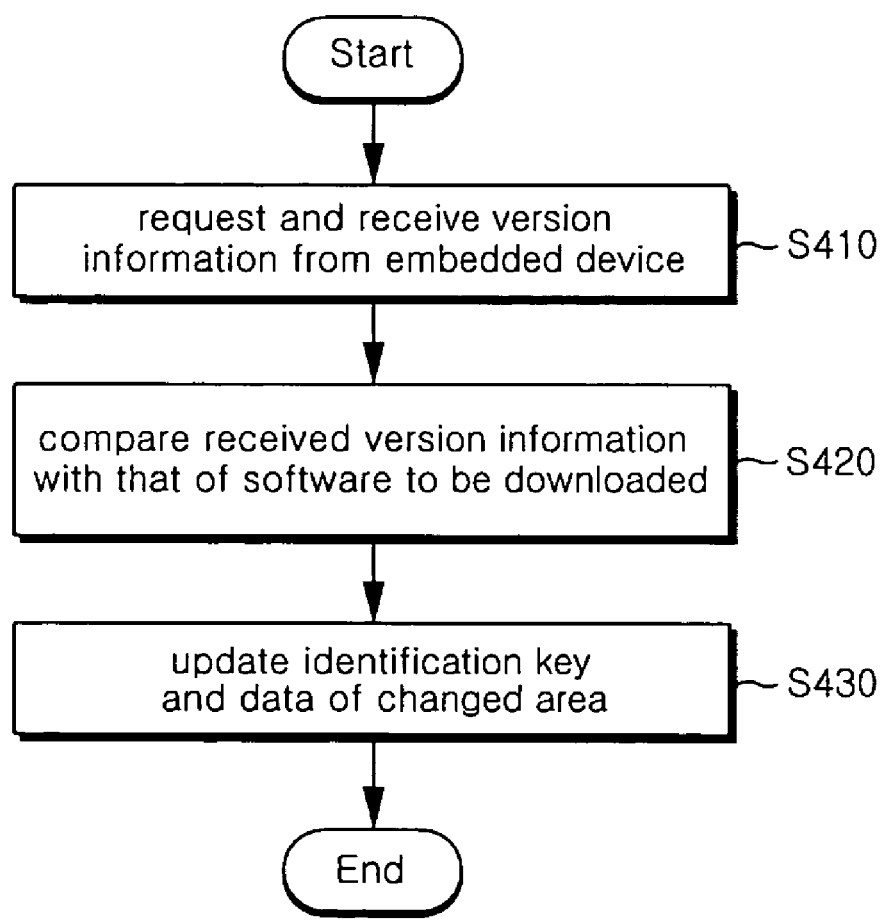
FIG. 5c is a flow chart illustrating another embodiment of the partial download process of the partial software update service system according to the present invention.

FIG. 5c is a flow chart illustrating another embodiment of the partial download process of the partial software update service system according to the present invention.

First, the download processing module 120 requests and receives version information of the software embedded in the embedded device 20 from the device 20 at a version information request step S410.

At a version information comparison step S420, the download processing module 120 compares the version information received at the version information request step S410 with that of software to be downloaded.

Finally, at a partial download processing step S430, if the received version information is determined to be different from that of the software to be downloaded, the download processing module 120 compares an identification key of each area of the software to be downloaded with that of each area of the software in the embedded device 20. If the identification key of at least one of the areas of the software to be downloaded is determined to be different from that of a corresponding one of the areas of the software in the embedded device 20, the download processing module 120 sends the identification key and data of the at least one area to the embedded device 20 to substitute data of the corresponding area of the software in the device 20 with the sent data and update the identification key of the corresponding area with the sent identification key.

In this manner, a search is made for at least one changed area among the areas of the software embedded in the embedded device 20 on the basis of the version information and identification keys, and data of only the changed area is downloaded to the embedded device 20 to upgrade the software therein, thereby making it possible to shorten an upgrade time of the software.

Figure 3E:
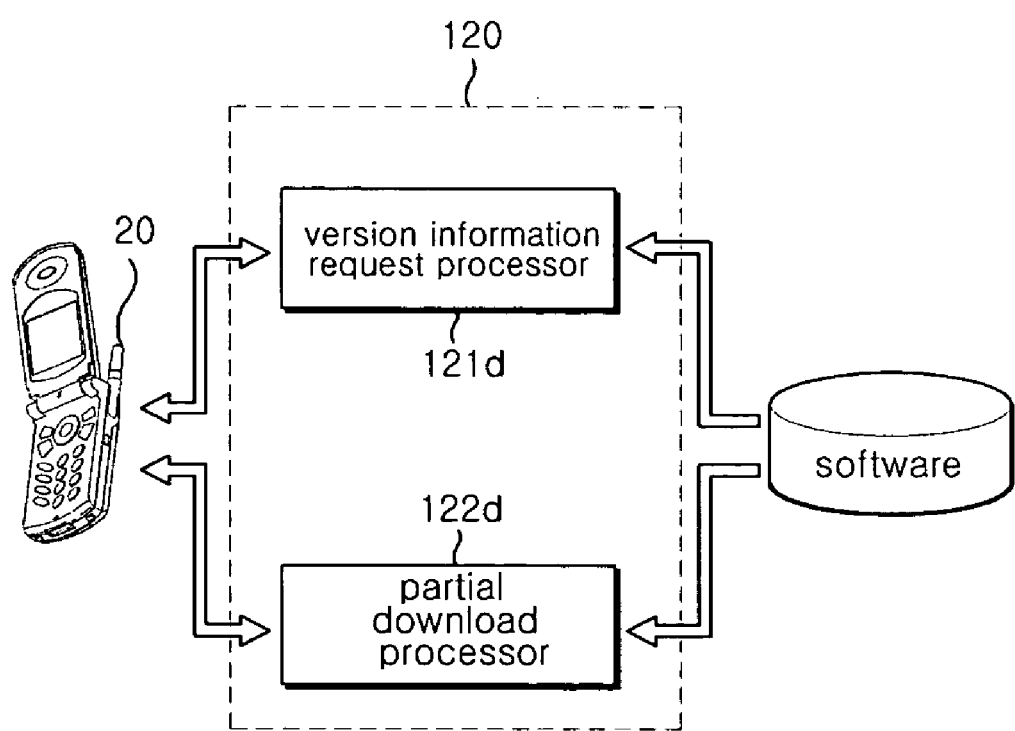
FIG. 3e is a block diagram of yet another embodiment of the download processing module in the partial software update service system according to the present invention.

FIG. 3e is a block diagram of yet another embodiment of the download processing module 120 in the partial software update service system according to the present invention.

In this embodiment, the download processing module 120 is adapted to check, through software version comparison, whether the software embedded in the embedded device 20 has been changed, in a different manner from that in the embodiment of FIG. 3b. To this end, the download processing module 120 includes a version information request processor 121d and a partial download processor 122d.

The version information request processor 121d acts to receive a request from the embedded device 20 for version information of software to be downloaded and send the version information to the embedded device 20 in response to the received request.

For example, assume that Mobile Explorer is executed in an Internet accessible mobile terminal which is the embedded device 20.

If the Mobile Explorer is executed by the user of the mobile terminal, then an automatic update engine under control of an OS of the mobile terminal is executed to request version information of software to be downloaded, or Mobile Explorer, from the business office terminal 10b, so as to check whether the Mobile Explorer has been changed.

In the business office terminal 10b, the version information request processor 121d of the download processing module 120 sends the version information of the Mobile Explorer to be downloaded, to the mobile terminal.

The automatic update engine in the mobile terminal compares the version information of the Mobile Explorer received from the business office terminal 10b, with that of the Mobile Explorer embedded in the mobile terminal and, if the version information of the Mobile Explorer to be downloaded is different from that of the Mobile Explorer in the mobile terminal, requests the business office terminal 10b to send data of at least one area, among areas of the Mobile Explorer to be downloaded, whose identification key is determined to be different from that of a corresponding one of areas of the Mobile Explorer in the mobile terminal.

The partial download processor 122d acts to receive the data sending request from the mobile terminal and send the identification key and data of the at least one area to the mobile terminal in response to the received request to update the identification key and data of the corresponding area of the software in the mobile terminal.

That is, the partial download processor 122d of the download processing module 120 sends data of a changed area of the Mobile Explorer to the mobile terminal, or the embedded device 20, in response to the data sending request therefrom so that the update engine in the mobile terminal can update the Mobile Explorer. The partial download processor 122d further sends an identification key of the changed area to the mobile terminal so that the update engine can update data in an identification key storage region of the mobile terminal for area-unit comparison when the software is updated at a later time.

The operation of the download processing module 120 with the above-stated configuration will hereinafter be described with reference to FIG. 5d.

Figure 5D:
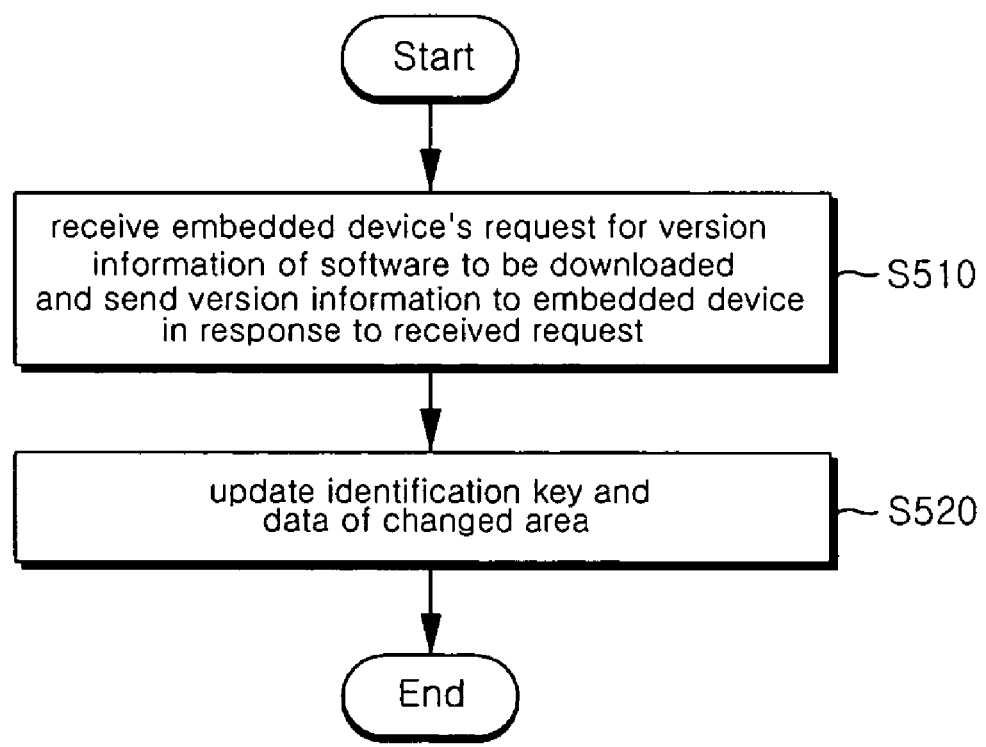
FIG. 5d is a flow chart illustrating yet another embodiment of the partial download process of the partial software update service system according to the present invention.

FIG. 5d is a flow chart illustrating yet another embodiment of the partial download process of the partial software update service system according to the present invention.

First, at a version information request processing step S510, the download processing module 120 receives a request from the embedded device 20 for version information of software to be downloaded and sends the version information to the embedded device 20 in response to the received request.

At a partial download processing step S520, the download processing module 120 receives a request from the embedded device 20 for data of at least one area, among areas of the software to be downloaded, whose identification key is determined to be different from that of a corresponding one of the areas of the software embedded in the embedded device 20, when the version information of the software to be downloaded is different from that of the software in the embedded device 20, and sends the identification key and data of the at least one area to the embedded device 20 in response to the received request to update the identification key and data of the corresponding area of the software in the device 20.

In this manner, a search is made for at least one changed area among the areas of the software embedded in the embedded device 20 on the basis of the version information and identification keys, and data of only the changed area is downloaded to the embedded device 20 to upgrade the software therein. Therefore, it is possible to shorten an upgrade time of the software embedded in the embedded device 20.

As described previously with reference to FIG. 3e, in order for the embedded device 20 to request data of a changed area of the software therein from the business office terminal 10b and update the software with the requested data, the embedded device or the software can include the automatic update engine.

Figure 3F:
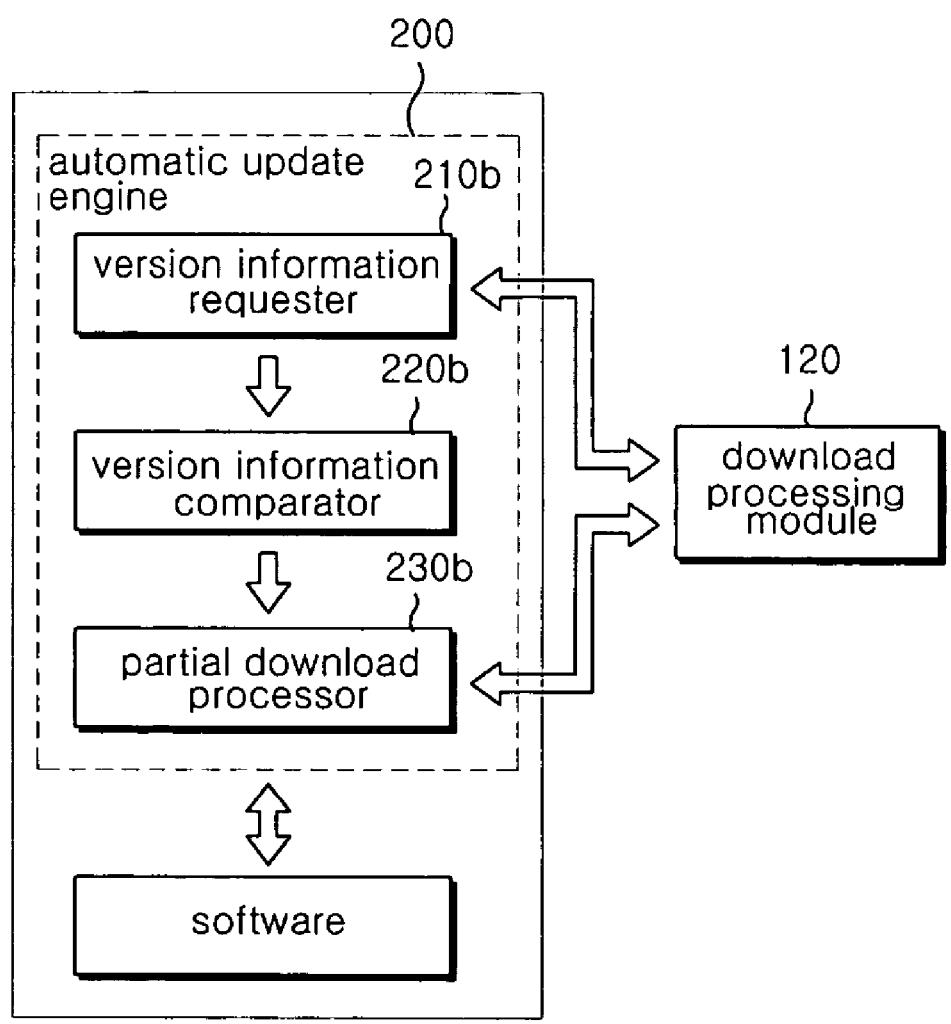
FIG. 3f is a block diagram of an embodiment of an automatic update engine in the embodiment of FIG. 3e, which is run in the embedded device.

FIG. 3f is a block diagram of an embodiment of an automatic update engine in the embodiment of FIG. 3e, which is run in the embedded device.

The automatic update engine 200 includes a version information requester 210b, a version information comparator 220b and a partial download processor 230b.

The version information requester 210b acts to request and receive version information of software corresponding to the software embedded in the embedded device 20 from the download processing module 120 to check whether the software in the embedded device 20 has been changed.

That is, if the automatic update engine 200 requests the version information of the corresponding software from the download processing module 120 through the version information requester 210b to check whether the software in the embedded device 20 has been changed, the download processing module 120 sends the requested version information through the version information request processor 121d. Then, the automatic update engine 200 receives the version information sent from the download processing module 120 through the version information requester 210b.

The version information comparator 220b acts to compare the version information received from the download processing module 120 with version information of the software embedded in the embedded device 20.

That is, upon receiving the version information sent from the download processing module 120, the automatic update engine 200 compares the received version information with that stored in the embedded device 20 through the version information comparator 220b.

If the version information of the corresponding software is determined to be different from that of the software in the embedded device 20 as a result of the comparison by the version information comparator 220b, the partial download processor 230b acts to request the download processing module 120 to send data of at least one area, among areas of the corresponding software, whose identification key is determined to be different from that of a corresponding one of the areas of the software in the embedded device 20. The partial download processor 230b also acts to receive the identification key and data of the at least one area sent from the download processing module 120, substitute data of the corresponding area of the software in the embedded device 20 with the received data, and update the identification key of the corresponding area with the received identification key.

That is, when the version information of the corresponding software is determined to be different from that of the software in the embedded device 20 as a result of the comparison by the version information comparator 220b, the automatic update engine 200 requests the download processing module 120 to send the data of the at least one area whose identification key is determined to be different from the corresponding area of the software in the embedded device 20. In response to the data sending request, the download processing module 120 sends the identification key and data of the at least one area to the embedded device 20. Then, the automatic update engine 200, through the partial download processor 230b, receives the identification key and data of the at least one area sent from the download processing module 120, substitutes the data of the corresponding area of the software in the embedded device 20 with the received data, and updates the identification key of the corresponding area with the received identification key.

In this manner, a search is made for at least one changed area among the areas of the software embedded in the embedded device 20 on the basis of the version information and identification keys, and data of only the changed area is downloaded to the embedded device 20 to upgrade the software therein, thereby shortening an upgrade time of the software.

Next, a detailed description will be given of the process of dividing software to be equipped in the embedded device into a plurality of areas each having a predetermined size, assigning unique identification keys respectively to the divided areas of the software, searching for at least one changed area among the areas of the software using the identification keys, and downloading data of only the changed area to the embedded device to upgrade the software therein.

First, assume that the size of software in the embedded device is 16 MB, a unit of dividing the software is 64 KB which is a minimum unit for erasure of data stored in a flash memory (typically 16 KB or 64 KB), and the identification key creation algorithm is the MD5 algorithm.

Figure 6:
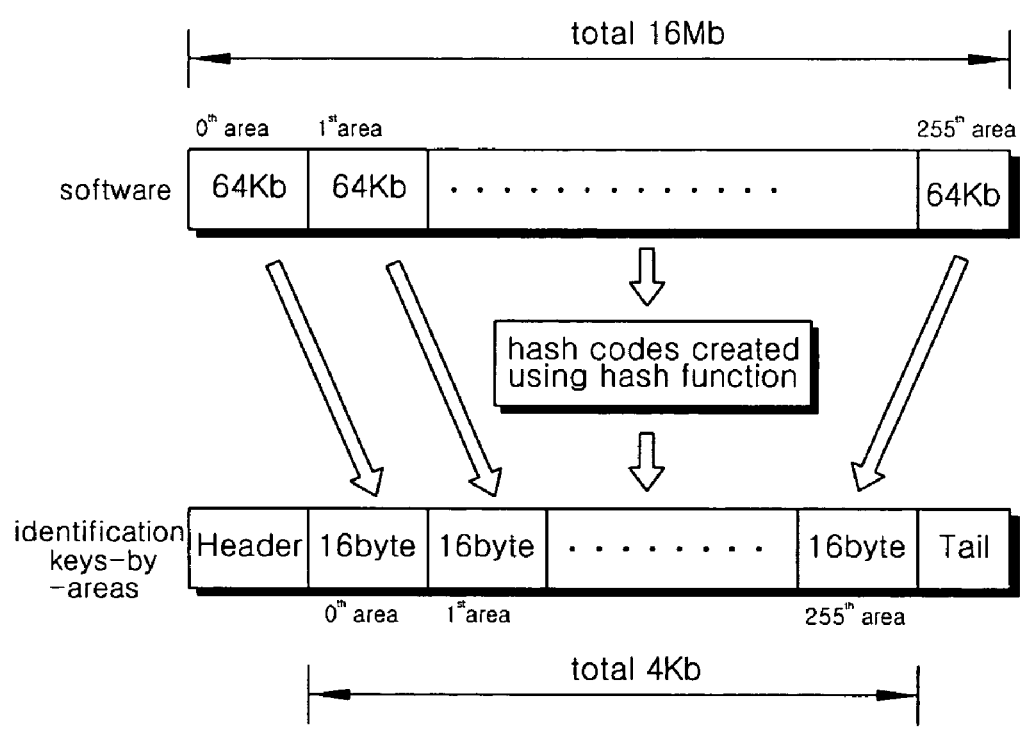
FIG. 6 is a view showing an example of a data structure of software divided into a plurality of areas by the identification key creation module and an example of a data structure of an identification key of each of the areas created by the identification key creation module.

As shown in FIG. 6, the area divider 111 of the identification key creation module 110 divides the 16 MB software by a unit of 64 KB to provide a total of 256 areas.

FIG. 6 shows an example of a data structure of software divided into a plurality of areas by the identification key creation module 110 and an example of a data structure of an identification key of each of the areas created by the identification key creation module 110.

The identification key creator 112 of the identification key creation module 110 creates respective identification keys of the 256 areas divided by the area divider 111. At this time, the identification key creator 112 creates 256 16-byte hash codes by processing data of each of the divided 64 KB areas using a hash function based on the MD5 algorithm (this hash function can be defined in various ways). These 256 hash codes are respective identification keys of the divided areas.

Thereafter, the identification key storage unit 113 of the identification key creation module 110 stores the identification key of each area created by the identification key creator 112, as shown in FIG. 6. Namely, the identification key storage unit 113 creates and stores an identification keys-by-areas file by writing identification key indication information in a header of the file and then sequentially writing the hash codes of the first to $256^{th}$ areas in the file subsequently to the header.

Since each hash code is 16 bytes long, the size required to store the 256 hash codes (identification keys) is 4 KB. The total size of the identification keys-by-areas file is the addition of the size of the header and the size of a tail to the hash code storage size.

The header includes flash information, mobile phone information and file information. Tags are written in start and end portions of the header to mark the start and end of the header, respectively. On the other hand, the header may further include version information of the associated software.

The flash information includes a ROM size, a RAM size, an EFS (Embedded File System) size, a divided area (block) size, an EFS start address, a RAM start address, etc.

The mobile phone information includes the model name of the mobile phone, the name of an image file to be used in downloading, etc.

The file information includes the name of a file to be partially downloaded, a file creation time, a hash method, etc.

The software and identification keys-by-areas file created in the above manner are stored in each of the embedded device and the terminal that provides the partial software update service.

Provided that the existing software has been outdated by new software, the identification key creation module 110 of the manufacturer terminal 10a divides the new software into a plurality of areas, creates an identification keys-by-areas file, and distributes the new software and identification keys-by-areas file to the business office terminal 10b that provides the partial software update service.

If the user visits the business office to request upgrade of the software in the embedded device 20, the download processing module 120, which is run in the business office terminal 10b, compares the identification keys-by-areas file stored in the terminal 10b with that stored in the device 20 to search for at least one area of the new software whose identification key is different from that of a corresponding one of the areas of the software in the device 20.

At this time, since the hash code of each area based on the MD5 algorithm is 16 bytes long, the download processing module 120 can detect at least one area of the new software whose identification key is different from that of the corresponding area of the software in the device 20, by sequentially reading and comparing data between the headers and tails of the two identification keys-by-areas files 16 bytes by 16 bytes. Upon detecting at least one area of the new software whose hash code (identification key) is different, the download processing module 120 downloads the hash code and data of the detected area from the business office terminal 10b to the embedded device 20 to change data of the corresponding area of the software in the device 20 to the downloaded data and update the hash code (identification key) of the corresponding area with the downloaded hash code. In this manner, it is possible to update a changed part of the software embedded in the embedded device 20.

A more detailed description will hereinafter be given of the partial download process between the download processing module 120 and the embedded device 20 with reference to FIGS. 7a and 8a.

If the user visits the business office to request upgrade of the software in the embedded device 20, the operator of the business office connects the device 20 to the business office terminal 10b to run the download processing module 120.

Figure 7A:
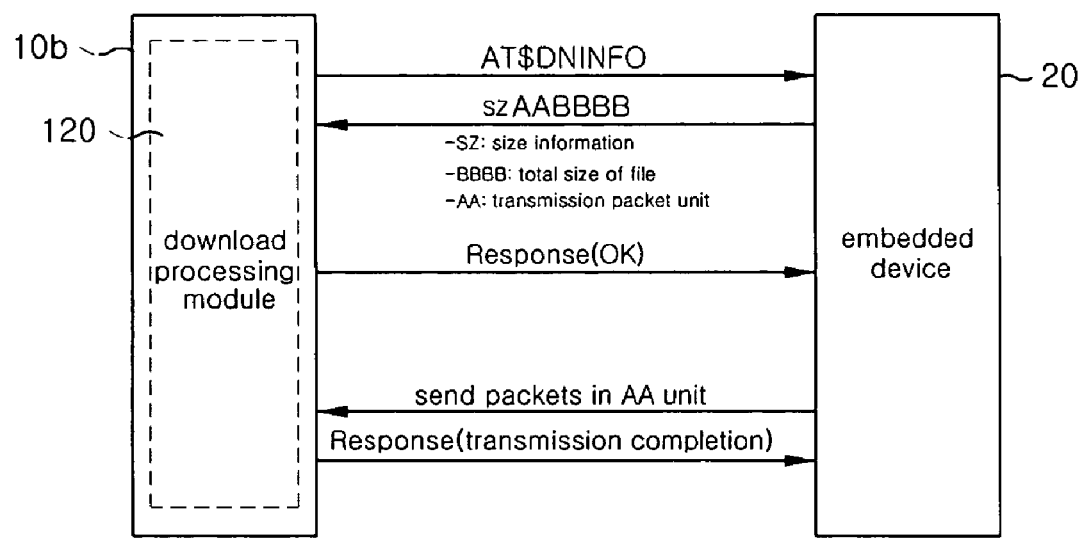
FIG. 7a is a view illustrating a signal flow of a process of fetching an identification keys-by-areas file from the embedded device by the download processing module using data communication.

First, the download processing module 120, which is run in the business office terminal 10b, fetches an identification keys-by-areas file from the embedded device 20 through a process of FIG. 7a.

FIG. 7a illustrates a signal flow of a process of fetching an identification keys-by-areas file from the embedded device 20 by the download processing module 120 using data communication.

The download processing module 120 sends request information AT$DNINFO to the embedded device 20 to request it to send an identification keys-by-areas file including an identification key of each area of the software embedded therein.

In response to the request information AT$DNINFO, the embedded device 20 analyzes a header of the identification keys-by-areas file stored therein and sends information szAABBBB for transmission of the identification keys-by-areas file to the download processing module 120 on the basis of a result of the analysis. The transmission information szAABBBB includes information about the total size BBBB of the identification keys-by-areas file and a file transmission packet unit AA.

If the download processing module 120 receives the transmission information szAABBBB from the embedded device 20 and sends response information (ok) to the device 20 to allow the transmission of the identification keys-by-areas file, the embedded device 20 sends the identification keys-by-areas file to the business office terminal 10b in the transmission packet unit AA.

When all packets of an amount corresponding to the total size BBBB of the identification keys-by-areas file are received, the download processing module 120 sends response information to the embedded device 20 to acknowledge completion of the file transmission.

Upon receiving the identification keys-by-areas file stored in the embedded device 20 in the above manner, the download processing module 120 compares an identification keys-by-areas file of the new software stored in the business office terminal 10b with the received file to search for at least one area of the new software whose identification key is different from that of a corresponding one of the areas of the software in the device 20. The search for the changed area was previously stated in detail and a detailed description thereof will thus be omitted.

Figure 8A:
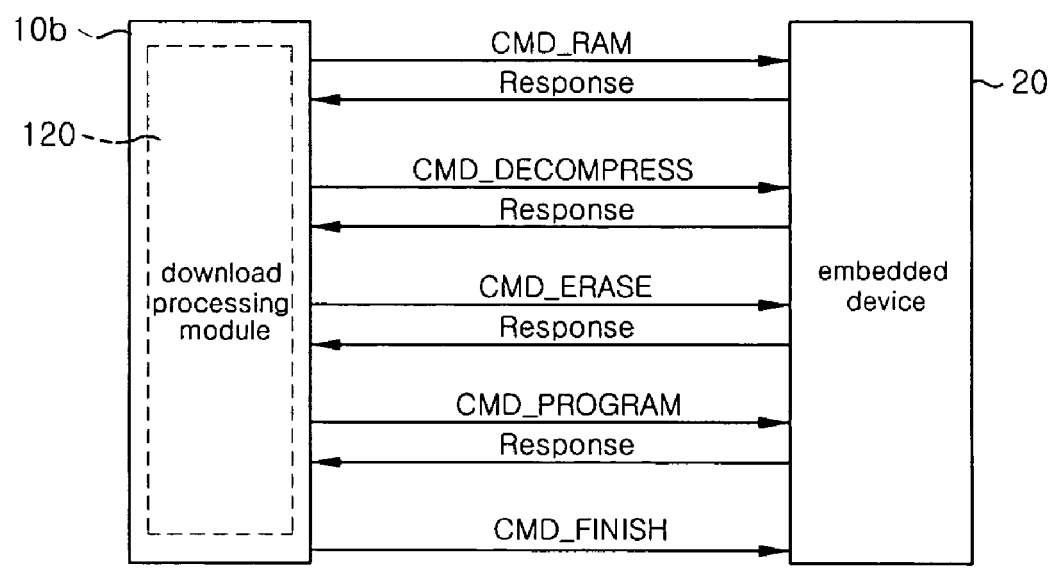
FIG. 8a is a view illustrating a signal flow of a process of downloading data of a changed area to the embedded device by the download processing module using data communication.

When at least one changed area is present among the areas of the software in the embedded device 20, the download processing module 120 selectively sends data of the changed area to the embedded device 20 through a process of FIG. 8a to update the software therein.

On the other hand, contrary to the above process, the embedded device can fetch an identification keys-by-areas file from the download processing module using data communication through a signal flow opposite to the signal flow of FIG. 7a.

FIG. 8a illustrates a signal flow of a process of downloading data of a changed area to the embedded device 20 by the download processing module 120 using data communication.

First, the download processing module 120 reads data of a changed area of software to be partially downloaded, which is stored in the business office terminal 10b, incorporates the read data in a command CMD_RAM to request writing of the read data in a specific address of a RAM of the embedded device 20, and sends the resulting command CMD_RAM to the device 20.

The embedded device 20 stores the read data in the specific address of the RAM thereof in response to the sent command CMD_RAM and sends response information to the download processing module 120.

Figure 7B:
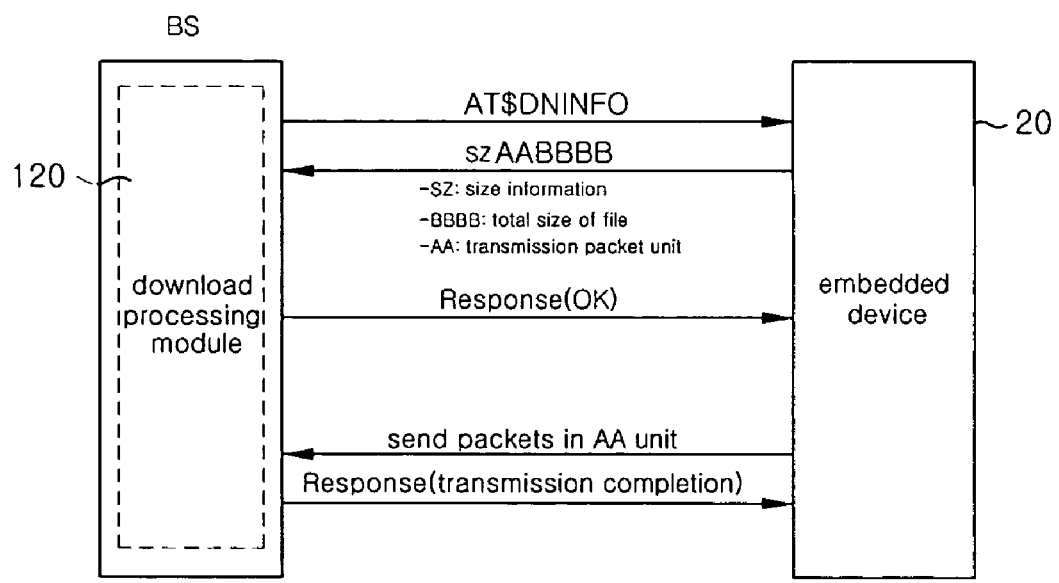
FIG. 7b is a view illustrating a signal flow of a process of fetching an identification keys-by-areas file from the embedded device by the download processing module using data communication based on an OTA manner.
Figure 8B:
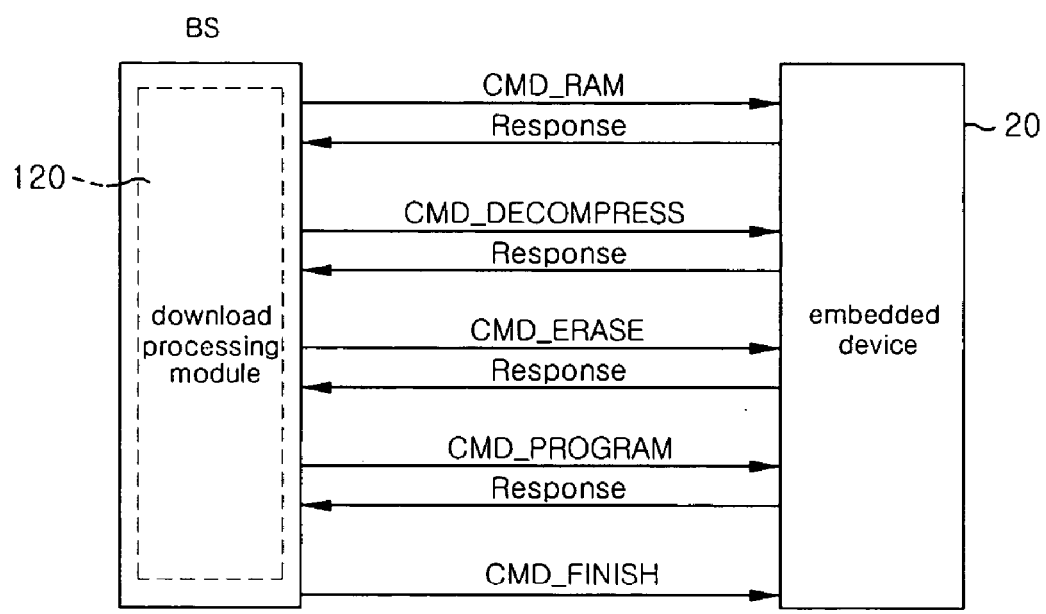
FIG. 8b is a view illustrating a signal flow of a process of downloading data of a changed area to the embedded device by the download processing module using data communication based on the OTA manner.

On the other hand, as shown in FIGS. 7b and 8b, the download processing module 120 may be installed in a server (not shown) linked to a mobile communication system, and an identification key of each area of the software to be partially downloaded and data of a changed area of the software can be transmitted to the embedded device 20 using a data communication service of the mobile communication system, for example, through an over the air (OTA) procedure. FIGS. 7b and 8b illustrate data flows between a base station (BS) and the embedded device 20.

In this case, the download processing module 120 can provide the partial software update service to the embedded device over a mobile communication network in a different manner from the case of being embedded in the business office terminal 10b, resulting in an advantage in that the user need not visit the business office.

The embodiments of FIGS. 7b and 8b are the same in data processing as the embodiments of FIGS. 7a and 8a, with the exception of the installed position and communication method of the download processing module 120, and a detailed description of the data processing will thus be omitted.

FIG. 9 shows data structures of the CMD_RAM command and response information thereto.

The CMD_RAM command includes command identification information, information on an address of the RAM of the embedded device where data is to be stored, etc.

Meanwhile, provided that the download processing module 120 reads, compresses and sends the data of the changed area of the software to be partially downloaded, which is stored in the business office terminal 10b, it further sends, to the embedded device 20, a command CMD_DECOMPRESS necessary for decompression of the compressed data in the embedded device 20.

FIG. 10 shows data structures of the CMD_DECOMPRESS command and response information thereto.

The CMD_DECOMPRESS command includes command identification information, information on an address of the RAM of the embedded device where compressed data is to be stored, information on an address of the RAM of the embedded device where decompressed data is to be stored, etc.

Thereafter, the download processing module 120 sends a command CMD_ERASE to the embedded device 20 to request it to erase data of a specific area (an area corresponding to the received data, or an area to be updated) of a flash memory in which the software to be partially updated is stored.

In response to the command CMD_ERASE, the embedded device 20 erases the data of the specific area of the flash memory thereof and sends response information to the download processing module 120.

FIG. 11 shows data structures of the CMD_ERASE command and response information thereto.

The CMD_ERASE command includes command identification information, information on an address of the flash memory of the embedded device where data to be erased is stored, etc.

Thereafter, the download processing module 120 sends a command CMD_PROGRAM to the embedded device 20 to request it to write the data stored in the specific address of the RAM of the embedded device 20 in the specific area (i.e., the data-erased area) of the flash memory of the device 20 to substitute the data of the specific area with the data stored in the specific address.

In response to the command CMD_PROGRAM, the embedded device 20 reads the data stored in the specific address of the RAM thereof and writes the read data in the specific area of the flash memory thereof to update the specific area, and sends response information to the download processing module 120.

FIG. 12 shows data structures of the CMD_PROGRAM command and response information thereto.

The CMD_PROGRAM command includes command identification information, information on an address of the RAM of the embedded device in which data to be downloaded is stored, information on an address of the flash memory of the embedded device in which the data to be downloaded is to be written, etc.

Thereafter, the download processing module 120 repeats the above process until all data of changed areas of the software to be partially downloaded, which is stored in the business office terminal 10b, is written in the corresponding areas of the flash memory of the embedded device 20 to update the software in the device 20.

When transmission of all data of the changed areas is completed, the download processing module 120 sends a command CMD_FINISH to the embedded device 20 to finish all operations of the device 20 and reset it.

FIG. 13 shows a data structure of the CMD_FINISH command.

As described above, according to the present invention, only a changed part of the software embedded in the embedded device is selectively downloaded to the embedded device, so that the software in the embedded device can be updated conveniently and rapidly.

As apparent from the above description, the present invention provides a communication terminal and communication network for partially updating software, a software update method, and a software creation device and method therefor, wherein the software is divided into a plurality of areas each having a predetermined size, unique identification keys are assigned to the areas of the software, respectively, a search is made for at least one changed area among the areas of the software on the basis of version information of the software or the identification keys, and data of only the changed area is downloaded to upgrade the software. According to the invention, it is possible to shorten an upgrade time of the software embedded in an embedded device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A communication terminal, comprising:
a software including a plurality of areas;
a memory to store identification keys respectively corresponding to the areas; and
an update processor to update a desired one of the plurality of areas,
wherein the identification keys are generated for each area using a hash function, the generated identification keys are compared with identification keys respectively corresponding to areas of an updated software stored in an update terminal, and the desired one of the plurality of areas is identified as an area of the software that is determined to be different from a corresponding area of the updated software stored in the update terminal,
wherein the update processor sends the identification keys in response to an identification key request, and
wherein an identification key corresponding to the updated desired one of the plurality of areas is received at the communication terminal and stored in the memory to replace an identification key corresponding to the desired one of the plurality of areas.

2. A communication terminal, comprising:
a memory to store a software including a plurality of areas;
a transmitter to transmit identification keys respectively corresponding to the areas of the software in response to an identification key request; and
an update processor to receive a new version of a desired one of the areas of the software and to update the desired area with the received new version,
wherein the identification keys are generated for each area using a hash function, the generated identification keys are compared with identification keys respectively corresponding to areas of an updated software stored in an update terminal, and the desired one of the plurality of areas is identified as an area of the software that is determined to be different from a corresponding area of the updated software stored in the update terminal, and
wherein an identification key corresponding to the new version of the desired one of the areas is received at the communication terminal and stored in the memory to replace an identification key corresponding to the desired one of the areas.

3. A communication terminal, comprising:
a memory to store a software including a plurality of areas;
a requester to request update of the software by transmitting an identification key request; and
an update processor to receive a new version of a desired one of the areas of the software and to update the desired area with the received new version,
wherein identification keys are generated for each area of the software using a hash function, the generated identification keys are compared with identification keys respectively corresponding to areas of an updated software, the updated software including the new version of the desired one of the areas, and the desired one of the areas is identified as an area of the software that is determined to be different from a corresponding area of the updated software, and
wherein an identification key corresponding to the new version of the desired one of the areas is received at the communication terminal and stored in the memory to replace an identification key corresponding to the desired one of the areas.

4. A communication network, comprising:
a communication terminal comprising a memory to store an old version software; and
an update system including a new version software corresponding the old version software, to determine a different part between the old version software and the new version software, and to send data of a part of the new version software corresponding to the different part to the communication terminal,
wherein each of the old version software and new version software includes a plurality of areas, each of the areas being assigned an identification key, the identification key being generated using a hash function,
wherein the update system determines the different part between the old version software and the new version software by requesting and receiving the respective identification keys of the areas of the old version software from the communication terminal, comparing the received identification keys with the respective identification keys of the areas of the new version software, and identifying the different part as an area of the old version software corresponding to a received identification key that is different from a respective identification key corresponding to an area of the new version software, and
wherein the identification key corresponding to the different part of the new version software is received at the communication terminal and stored in the memory to replace the identification key corresponding to the different part of the old version software.

5. A communication network, comprising:
a communication terminal comprising a memory to store an old version software with a plurality of areas and to request update of the old version software; and
an update system including a new version software with a plurality of areas corresponding to the old version software, to determine in response to the update request from the communication terminal whether a specific area to be updated is present among the areas of the old version software and, upon determining that the specific area to be updated is present, to send data of one of the areas of the new version software corresponding to the specific area to the communication terminal,
wherein the areas of the old version software and the areas of the new version software are assigned identification keys, respectively, the identification keys being generated using a hash function, and
wherein the update system is adapted to determine the specific area to be updated by requesting and receiving the respective identification keys of the areas of the old version software from the communication terminal, comparing the received identification keys with the respective identification keys of the areas of the new version software, and identifying the specific area to be updated as an area of the old version software corresponding to a received identification key that is different from a respective identification key corresponding to an area of the new version software, and wherein the identification key corresponding to the specific area of the new version software is received at the communication terminal and stored in the memory to replace the identification key corresponding to the specific area of the old version software.

6. A method for updating an old version software with a new version software, comprising:

determining a different part between the old version software stored in a memory of a communication terminal and the new version software by requesting and comparing identification keys of the old version software with identification keys of the new version software; and writing data of a part of the new version software corresponding to the different part in a part of the old version software corresponding to the different part, wherein each of the old version software and new version software includes a plurality of areas, each of the areas being assigned the identification keys, the identification keys being generated using a hash function, wherein the different part between the old version software and the new version software is determined by comparing the respective identification keys of the areas of the old version software with the respective identification keys of the areas of the new version software, and identifying the different part as an area of the old version software corresponding to an identification key that is different from an identification key corresponding to an area of the new version software, and wherein the identification key corresponding to the different part of the new version software is received at the communication terminal and stored in the memory to replace the identification key corresponding to the different part of the old version software.

7. A method for updating an old version software with a new version software, comprising:

providing identification keys of the old version software stored in a memory of a communication terminal in response to an identification key request;

receiving data of a part of the new version software corresponding to a different part between the old version software and the new version software; and writing the received data in a part of the old version software corresponding to the different part, wherein each of the old version software and new version software includes a plurality of areas, each of the areas being assigned identification keys, the identification keys being generated using a hash function, and wherein the method further comprises determining the different part between the old version software and the new version software by comparing the respective identification keys of the areas of the old version software with the respective identification keys of the areas of the new version software, and identifying the different part as an area of the old version software corresponding to an identification key that is different from an identification key corresponding to an area of the new version software, and wherein the identification key corresponding to the different part of the new version software is received at the communication terminal and stored in the memory to replace the identification key corresponding to the different part of the old version software.

8. A method for updating an old version software with a new version software, comprising:

determining a different part between the old version software stored in a memory of a communication terminal and the new version software through a comparison of identification keys therebetween;

sending data of a part of the new version software corresponding to the different part; and receiving the sent data and writing the received data in a part of the old version software corresponding to the different part, wherein each of the old version software and new version software includes a plurality of areas, each of the areas being assigned an identification key, the identification keys being generated using a hash function, and wherein the different part between the old version software and the new version software is determined by requesting and comparing the respective identification keys of the areas of the old version software with the respective identification keys of the areas of the new version software, and identifying the different art as an area of the old version software corresponding to an identification key that is different from an identification key corresponding to an area of the new version software, and wherein the identification key corresponding to the different part of the new version software is received at the communication terminal and stored in the memory to replace the identification key corresponding to the different part of the old version software.

9. A software creation device, comprising:

an area divider to divide a desired software to be stored in a memory of a communication device into a plurality of areas, each of the areas having a predetermined size; and an identification key creator to create respective identification keys of the areas divided by the area divider, wherein the identification keys are generated for each area using a hash function, and the software is updated in the communication device by comparing the generated identification keys with identification keys respectively corresponding to areas of an updated software stored in an update terminal in response to receiving an identification key request, and identifying a part of the software to be updated as an area of old version software corresponding to a generated identification key that is different from an identification key corresponding to an area of the updated software, and wherein the identification key corresponding to the area of the updated software is transmitted to the communication device to be stored in the memory to replace the generated identification key corresponding to the area of the old version software.

10. The software creation device as set forth in claim 9, further comprising an identification key storage unit for storing the identification keys created by the identification key creator.

11. The software creation device as set forth in claim 9, wherein the identification keys are stored in a desired region of the software.

12. The software creation device as set forth in claim 9, wherein the identification keys are stored in a desired memory area.

13. A software creation method, comprising:

dividing a desired software to be stored in a memory of a communication device into a plurality of areas, each of the areas having a predetermined size; and creating respective identification keys of the divided areas, wherein the identification keys are generated for each area using a hash function, and the software is updated in the communication device by comparing the generated identification keys with identification keys respectively corresponding to areas of an updated software stored in an update terminal in response to receiving an identification key request, and identifying a part of the software to be updated as an area of old version software corresponding to a generated identification key that is different from an identification key corresponding to an area of the updated software, and wherein the identification key corresponding to the area of the updated software is transmitted to the communication device to be stored in the memory to replace the generated identification key corresponding to the area of the old version software.

14. The software creation method as set forth in claim 13, further comprising storing the created identification keys in a desired region of the software.

15. The software creation method as set forth in claim 13, further comprising storing the created identification keys in a desired memory area.

* * * * *